United States Patent [19]
Benjamin

[11] Patent Number: 5,138,753
[45] Date of Patent: Aug. 18, 1992

[54] COWLING CLOSING DEVICE

[76] Inventor: Sanharib W. Benjamin, 8713 Pershing Rd., Playa Del Rey, Calif. 90293

[21] Appl. No.: 546,929

[22] Filed: Jul. 2, 1990

[51] Int. Cl.⁵ .............................................. B23P 19/04
[52] U.S. Cl. .......................................... 29/238; 29/267
[58] Field of Search ....................... 254/213, 217, 218; 29/267, 238; 24/68 D

[56] References Cited

U.S. PATENT DOCUMENTS

| | | | |
|---|---|---|---|
| 1,001,547 | 8/1911 | McMillen | 254/217 |
| 1,072,599 | 9/1913 | Gibbons | 254/218 |
| 2,946,563 | 7/1960 | Eaton | 254/217 |
| 4,102,018 | 7/1978 | Kawahara | 24/68 D |
| 4,199,134 | 4/1980 | Kerber et al. | 254/218 |

Primary Examiner—Robert C. Watson
Attorney, Agent, or Firm—James Brunton

[57] ABSTRACT

An aircraft engine cowling closing apparatus for use in connection with aircraft cowling of the character having first and second portions swingably movable from an open position to gain access to the engine to a second closed position enclosing the engine. The apparatus can be coupled to the engine cowling and used to urge the first and second portions thereof into engagement.

4 Claims, 3 Drawing Sheets

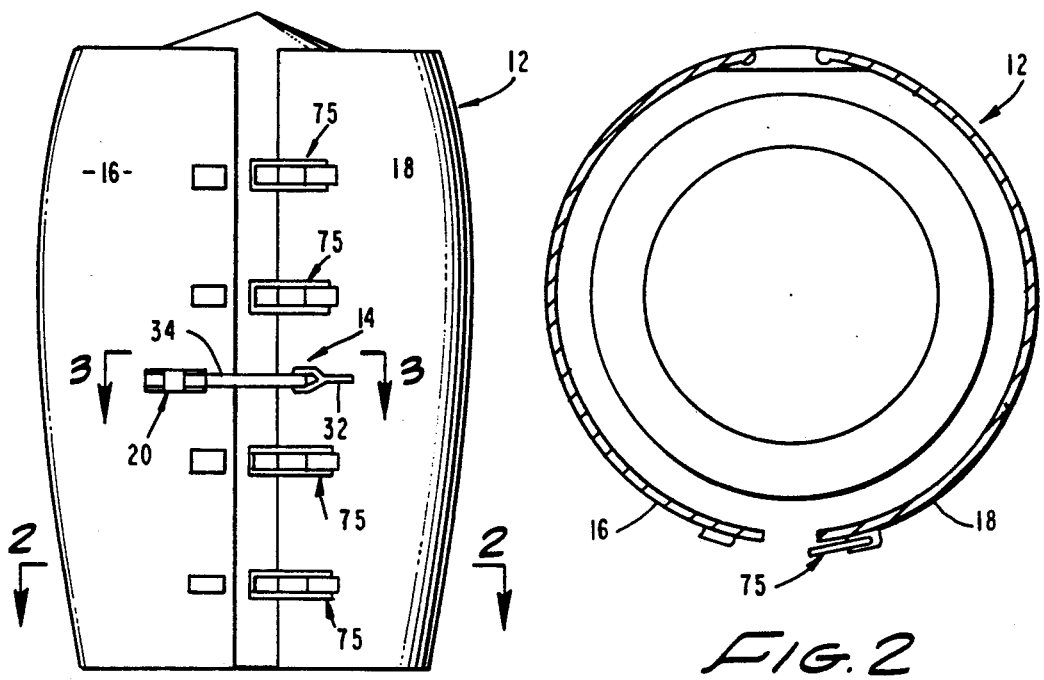
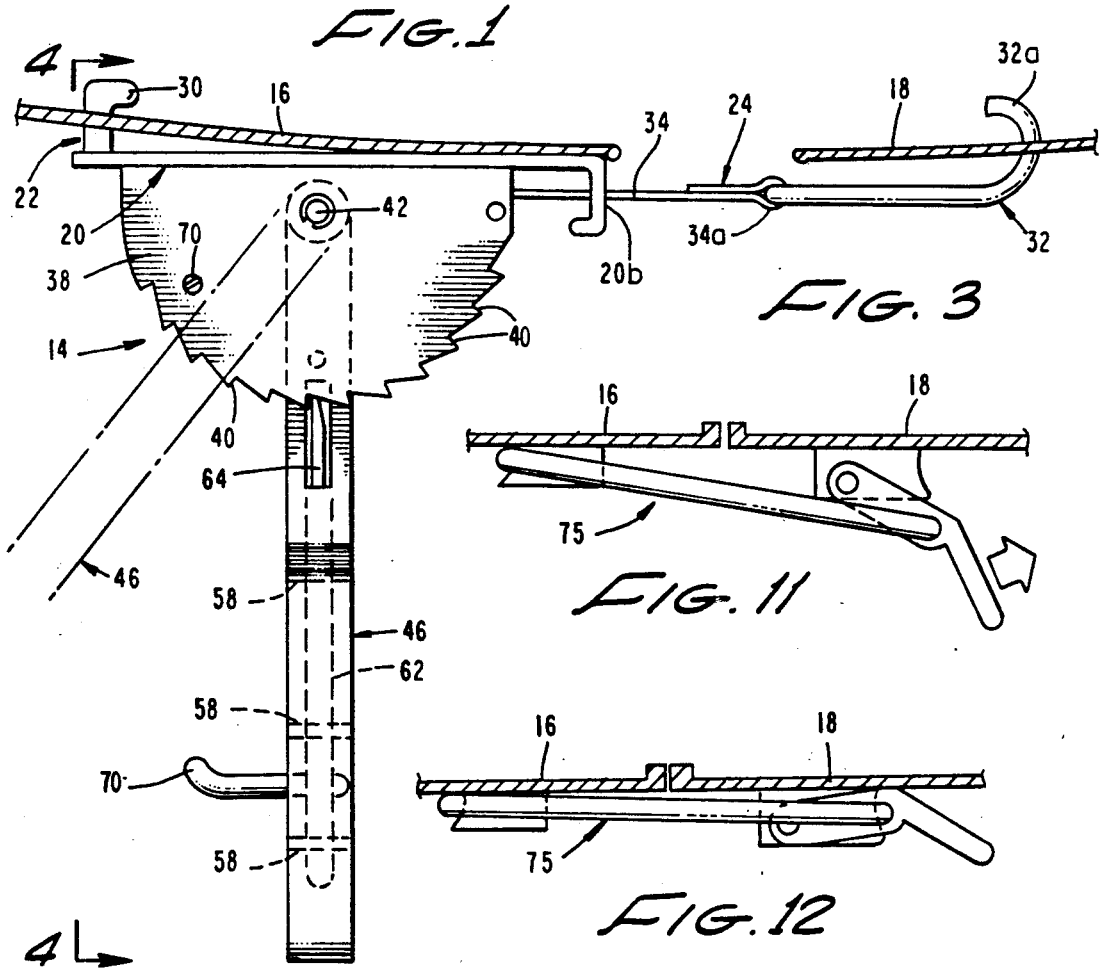

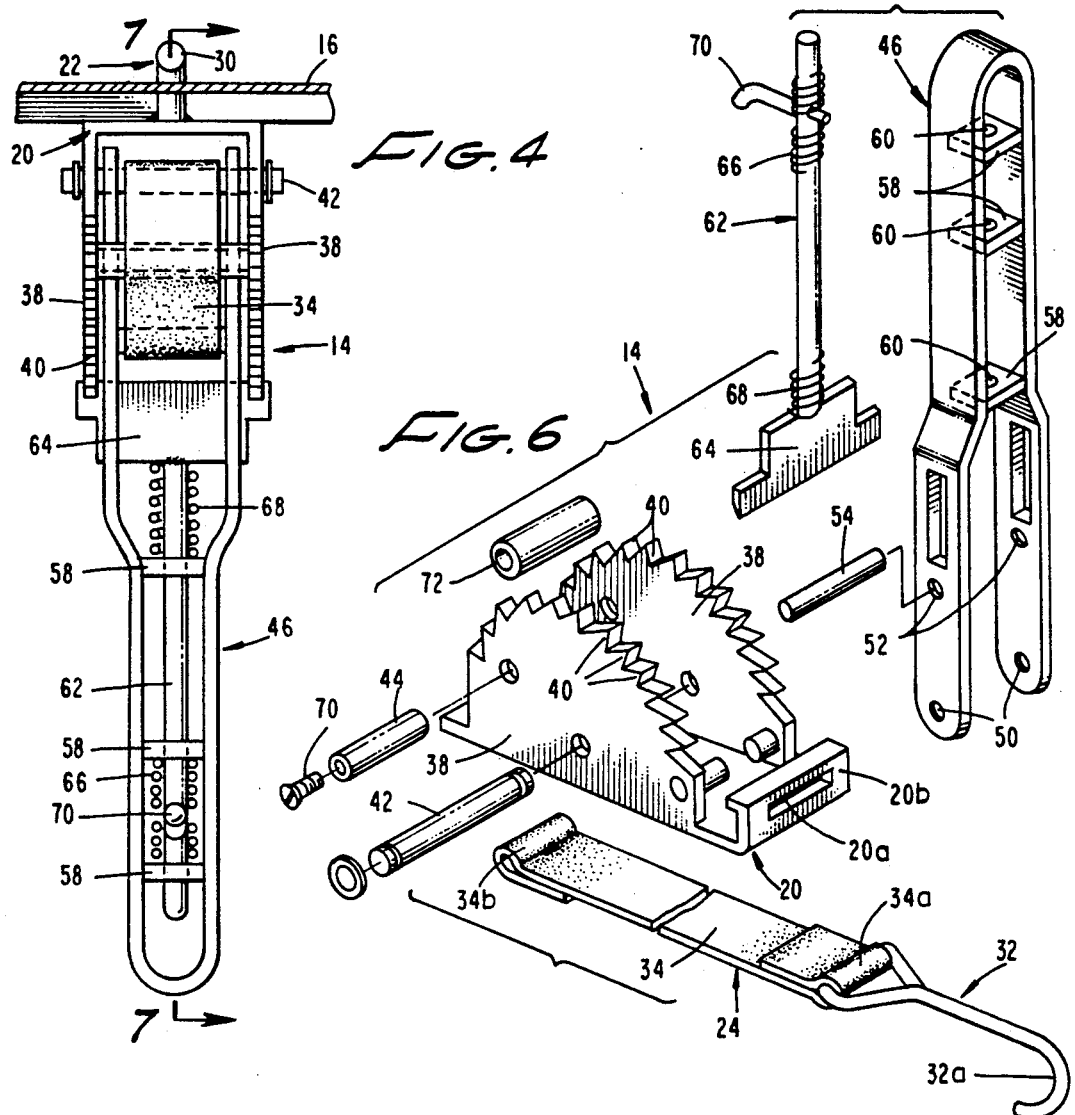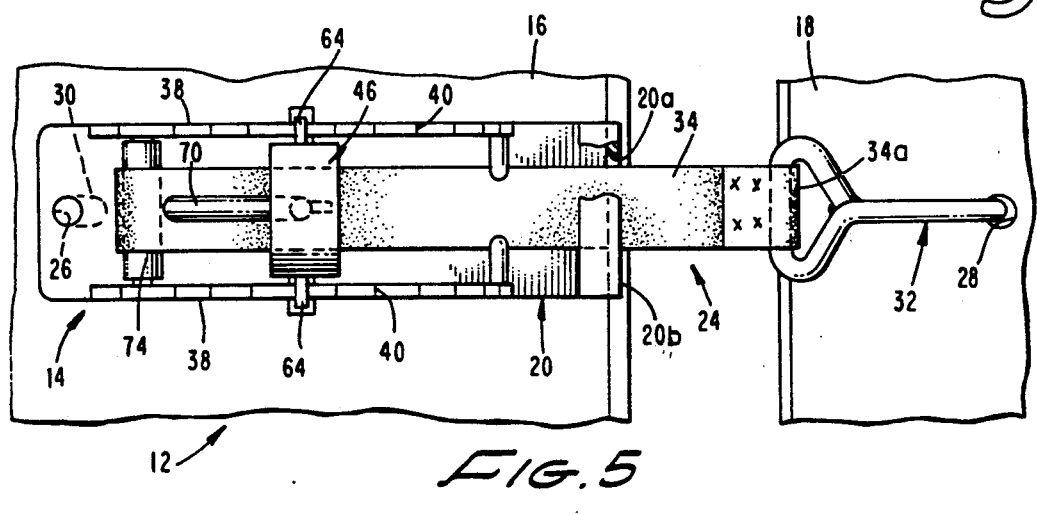

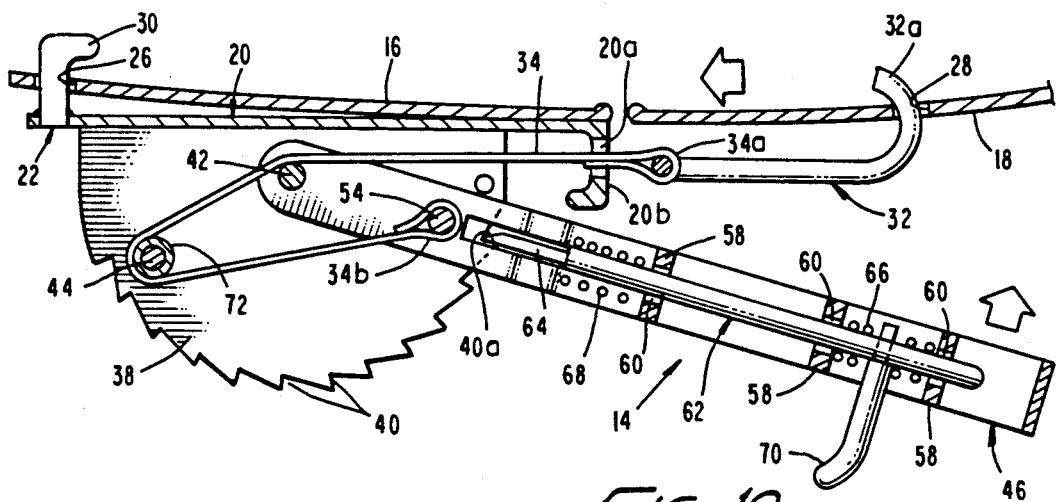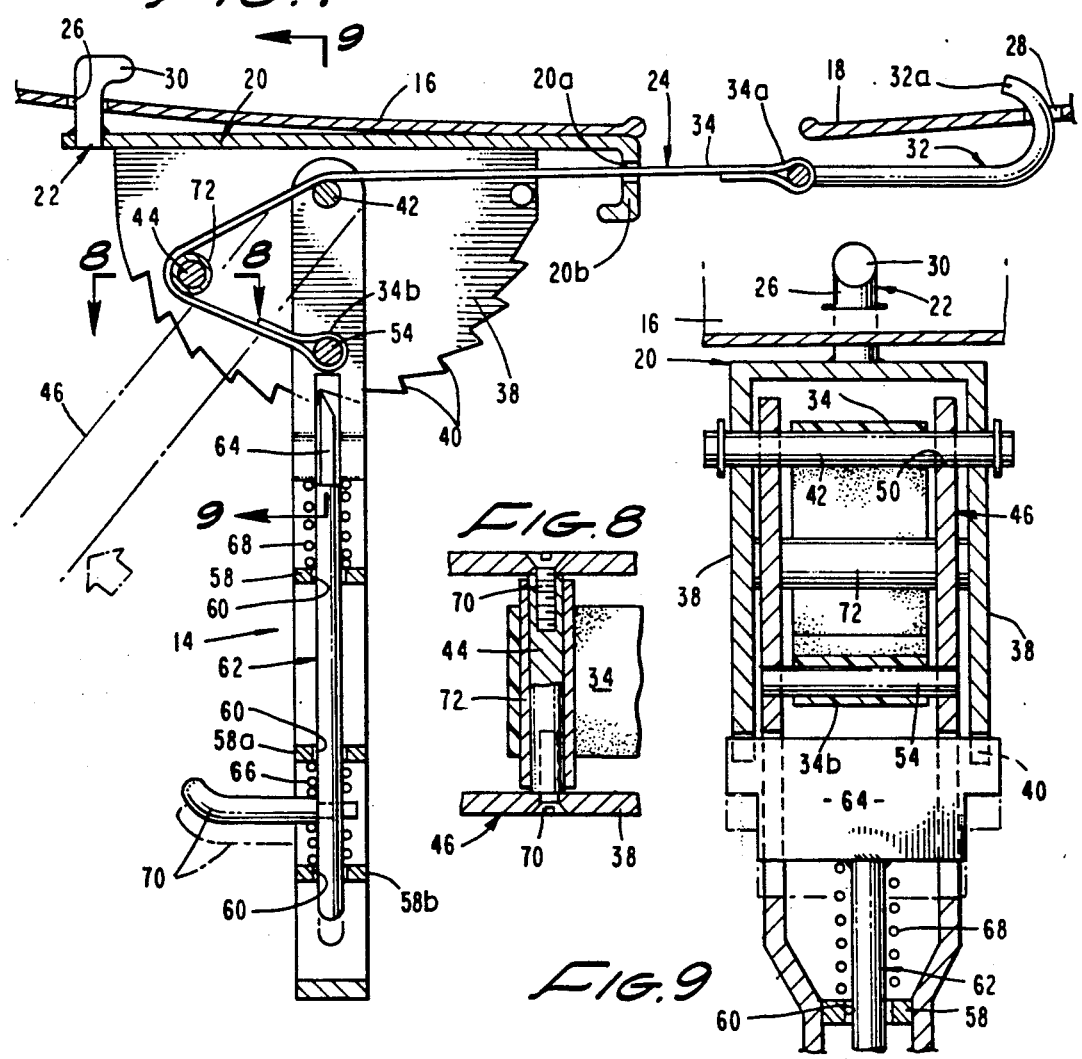

COWLING CLOSING DEVICE

BACKGROUND OF THE INVENTION

1. Field of The Invention

The present invention relates generally to a mechanical apparatus controllably for moving one object toward another object. More particularly, the invention concerns an engine cowling closing device for use in connection with aircraft cowling of the character having first and second portions swingably movable from an open position to gain access to the engine to a second closed position enclosing the engine.

2. Discussion of The Invention

Aircraft engines, particularly large jet engines, are provided with very large, generally annular shaped cowlings which normally enclose the jet engine during flight. These cowlings typically include first and second portions, which are swingably movable in a clam shell like manner from a first closed position to a second open position to gain access to the engine for maintenance.

The cowlings are generally constructed from thin aluminum sheets which are formed into sections that are hingeably connected along one edge to the cowling body and, when in a closed position, meet along their free edges. The two sections are typically locked together in the closed position by a plurality of locking mechanisms similar to baggage trunk locks. To gain access to the engine the locks are released and the cowling portions are swung apart.

The cowling portions are constructed so that when they are moved toward their closed positions the mating edges do not meet, but rather are spaced apart a few inches. To close the cowlings, the two mating portions must be forceably urged toward one another so that the locking mechanisms can be engaged. In the past, this final closing step has been accomplished by inserting the shank portion of two long screwdrivers into apertures provided in each of the cowling portions proximate their mating edges and then physically prying the cowling portions together using the screwdrivers to obtain leverage. This method of closing the cowlings requires two people and is most cumbersome. Further, if one or both of the screwdrivers slip during the final closure step the aircraft can be damaged or the maintenance persons injured.

The present invention overcomes the problems inherent in closing the aircraft cowlings by providing a small, lightweight and easy to use apparatus which can readily be connected to the cowling portions using the same apertures that are provided for receipt of the screwdrivers. The apparatus includes an elongated strap connected at one end to an operating assembly and at the other end to an anchor which is receivable in the aperture provided in one of the cowling portions. The operating assembly includes a second anchor which is receivable in the aperture provided in the other cowling portion. A lever actuated ratchet mechanism foreshortens the strap in a manner to controllably move the cowling portions into precise mating engagement.

SUMMARY OF THE INVENTION

It is an object of the present invention to provide a closing device for use in urging first and second partially open engine cowling portions into a closed position.

It is another object of the invention to provide a closing device of the aforementioned character which is compact, lightweight and easily connectable to the aircraft cowling without the necessity of modifying the cowling.

Another object of the invention is to provide a closing device of the character described which can be safely operated by only one person.

Another object of the invention is to provide a device of the type described in the preceding paragraphs which is safe to use, requires minimum training and will not damage the aircraft or injure the operator.

Still another object of the invention is to provide a device of the class described which is of simple construction and can be inexpensively manufactured.

BRIEF DESCRIPTION OF THE DRAWINGS

FIG. 1 is a bottom view of an aircraft cowling illustrating the apparatus of the present invention affixed to the cowling.

FIG. 2 is a cross-sectional view of the cowling taken along lines 2—2 of FIG. 1.

FIG. 3 is a greatly enlarged view taken along lines 3—3 of FIG. 1.

FIG. 4 is a view taken along lines 4—4 of FIG. 3.

FIG. 5 is a fragmentary enlarged view of the apparatus of the invention in position on the open aircraft cowling.

FIG. 6 is a generally perspective exploded view of the apparatus of the invention.

FIG. 7 is a view taken along lines 7—7 of FIG. 4.

FIG. 8 is a cross-sectional view taken along lines 8—8 of FIG. 7.

FIG. 9 is a cross-sectional view taken along lines 9—9 of FIG. 7.

FIG. 10 is a diagrammatic view of the apparatus of the invention showing the manner in which the device is operated to pull the aircraft cowling into a closed position.

FIG. 11 is an enlarged fragmentary view of the cowling latching mechanism of the character used on aircraft to latch the cowling in a closed position.

FIG. 12 is a view similar to FIG. 4 showing the cowling latching mechanism cammed into a fully latched position.

DESCRIPTION OF THE INVENTION

Referring to the drawings and particularly to FIGS. 1, 2, 3, and 6, the closure device of the present invention for closing an engine cowling 12 is generally designated by the numeral 14. The device of the invention is used for closing a cowling of the character typically used on jet aircraft for enclosing the engine and having first and second portions 16 and 18 swingably movable from a first spaced-apart position shown in FIGS. 1 and 2 to a closed position encapsulating the aircraft engine.

In the form of the invention shown in the drawings, the device of the invention comprises a base 20 (FIG. 3), first anchor means, generally designated by the numeral 22, for releasably interconnecting base 20 to first portion 16 of the cowling and connection means, generally designated by the numeral 24, for interconnecting base 20 with the second portion 18 of the cowling.

As previously discussed and as shown in FIG. 5, cowling portion 16 and 18 are typically provided with apertures 26 and 28 respectively. Aperture 26 and 28 are adapted to receive the shanks of screwdrivers which, prior to the present invention, were used to force cowling portions 16 and 18 into a closed locking position. In order to avoid modification to the aircraft cowling and to use apertures 26 and 28 in connection with the device of the present invention, anchor means 22 is here provided in the form of a hook-like member 30 which is affixed to base 20 and is closely receivable within aperture 26 of the aircraft cowling. Similarly, in the present embodiment of the invention, connection means 24 includes a hook-like member 32 having a hook portion 32a thereof which is receivable within aperture 28 of the aircraft cowling.

The connection means of the embodiment of the invention shown in the drawings also comprises a spanner member, or strap 34, having a length sufficient to span the space between the first and second portions of the engine cowling. Turning also to FIG. 6 it can be seen that strap 34 is connected proximate its end 34a with hook-like member 32. The opposite end 34b of strap 34 is connected with base 20 in a manner presently to be described.

Also forming a part of the closure device of the present embodiment of the invention is operating means connected to base 20 and operably associated with spanner member, or strap 34, for moving the second anchor means or hook 32 toward the first anchor means 22, whereby the first and second cowling portions 16 and 18 will move into a closed, engine-encapsulating position. As best seen by referring to FIG. 6, the operating means comprises a pair of transversely, spaced-apart generally semi-circular shaped plates 38. Plates 38 are connected to base 20 and extend outwardly therefrom in a manner shown. Each plate 38 is provided with a plurality of circumferentially spaced teeth 40.

Extending between plates 38 is an axle 42 and a strap engaging assembly including a pin like member 44. Lever means shown here as fork-like lever member 46, is connected to and is pivotably movable about axle 42. As indicated in FIG. 6, each of the forks of member 46 is provided with apertures 50 for receipt of axle 42 and with apertures 52 for receipt of a transversely extending strap anchor member 54.

Interconnected between the side portions of fork member 46 are three spaced-apart guide members 58 each having a central aperture 60. Received for telescopic movement within apertures 60 is a locking means, including a shaft portion 62 and a teeth engaging locking portion 64. The locking means of this form of the invention functions to selectively engage teeth 40 on plates 38 so as to permit movement lever arm member 46 from a first position to a second position, but preventing movement thereof in the opposite direction. Biasing means are carried by shaft 62 for yieldably urging teeth engaging portion, or locking member, 64 into engagement with teeth 40 provided on plates 38. In the embodiment of the invention shown in the drawings, these biasing means are provided in the form of upper and lower coiled springs 66 and 68 which encompass shaft 62 and, in the manner shown in FIG. 7, act on spacer plates 58 to continuously urge locking member 64 into engagement with teeth 40. A release pin 70 is connected to shaft 62 and extends outwardly therefrom between spacers 58 identified in FIG. 7 by the numeral 58a and b. Release pin 70 functions to enable the locking means to be moved in a direction away from plates 38 and against the urging of the biasing means so that locking member 64 will move out of locking engagement with teeth 40 permitting lever arm 46 to be freely rotated about shaft 42 (See phantom lines in FIG. 7).

As best seen by referring to FIG. 7, strap 34 extends through a slot 20a formed in an end wall 20b of base 20. Strap 34 is then entrained over axle 42 over the strap engaging assembly, including member 44 and is affixed proximate its end 34b to member 54. Turning to FIG. 8, it is to be observed that member 44 is held in position with respect to plates 38 by threaded fasteners 70. In addition to member 44, the strap engaging assembly comprises a sleeve 72 which surrounds member 44 and is freely rotatable with respect thereto.

In operating the apparatus of the invention with the aircraft cowling in the open position shown in FIG. 5, anchor 30 is inserted into aperture 26 of portion 16 of the cowling. Next, with lever 46 in a freely movable configuration, hook 32a of anchor 32 is inserted into aperture in cowling portion 18. In this position, as best shown in FIG. 7, strap 34 spans the spacing between cowling portion 16 and 18, passes through slot 20a, around axle 42, around sleeve 72 and is connected proximate end 34b to member 54. With the apparatus in the position shown in FIG. 7, lever arm or fork member 46 can be freely moved into the position shown in FIG. 10. Due to the configuration of teeth 40 and of locking member 64, as the lever arm is moved in the direction of arrow in FIG. 10, the locking member 64 will freely ride over teeth 40. As the lever arm is moved in the direction of the arrow in FIG. 10, it will foreshorten strap 34 and will draw portion 18 of the cowling into close proximity with portion 16 of the cowling. At this point, locking member 64 will engage the radial flat portion of teeth designated in FIG. 10 by the numeral 40a so as to block movement of the lever arm in a reverse direction toward the starting position shown in FIG. 7. Member 46 can then be released so that the cowl-locking mechanisms shown in FIGS. 1, 11 and 12 and generally designated by the numeral 75 can sequentially be moved from the unlocked position shown in FIG. 7 to the locked position shown in FIG. 12. These locking mechanisms are of a cam locking variety of the character frequently used on luggage and are well known to those skilled in the art. As indicated in FIG. 12, as the locking mechanism is cammed in the direction of the arrow of FIG. 11 in the closed position shown in FIG. 12, cowling portions 16 and 18 will be moved into close proximity so as to encapsulate the aircraft engine. After the cowling is securely locked in the closed position, release pin 70 is moved against the urging of springs 66 and 68 to free locking member 64 from tooth 40a. The lower arm can then be returned to its starting position so that the anchor means can be separated from the cowling apertures and the apparatus can be removed from the aircraft for later use.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A closure device for closing an engine cowling of the character having first and second portions swingably movable from a first spaced apart position to a second closed position, said device comprising:

(a) base;

(b) first anchor means for releasably interconnecting said base to said first portion of said cowling;

(c) connection means for releasably interconnecting said base with said second portion of said cowling, said connection means comprising:
- (i) a spanner member for spanning the space between said first and second portions of said cowling, said spanner member having first and second ends;
- (ii) second anchor means connected to said second end of said spanner member for releasable interconnection with said second portion of said cowling; and (d) operating means connected to said base and operably associated with said spanner member for moving said second anchor means toward said first anchor means whereby said first and second cowling portions will move into said second closed position, said operating means comprising:
- (i) a pair of generally semicircular shaped plates connected to said base and extending outwardly therefrom said plates being spaced apart a sufficient distance to receive therebetween said spanner member and, each said plate having a plurality of circumferentially spaced teeth;
- (ii) an axle extending between said plates;
- (iii) a spanner member engaging rod extending between said plates at a spaced apart location from said axle; and (e) a lever arm pivotally connected proximate one end thereof to said axle, said lever arm being movable from a first position to a second position and including connector means for interconnection with said first end of said spanner member; whereby said spanner member extends between said plates, under said axle, around said spanner member engaging rod and toward said connector means for interconnection of the first end thereof with said lever arm.

2. A closure device as defined in claim 1 in which said spanner member of said connection means comprises an elongated flexible strap.

3. A closure device as defined in claim 1 in which said operating means further includes locking means for releasably locking said lever arm in a plurality of positions relative to said upstanding member.

4. A closure device for closing a cowling of the character used to enclose an aircraft engine, said cowling comprising first and second portions initially movable from a first open position to a second partially closed position, each said portion having an aperture provided therein, said closure device functioning to move said first and second portions into a fully closed position and comprising:

(a) a base;

(b) first anchor means connected to said base for insertion into the aperture provided in one of said first and second cowling portions;

(c) a pair of transversely spaced apart, generally semicircular shaped plates fixally connected to said base and extending outwardly therefrom, each said plate having a plurality of circumferentially spaced teeth;

(d) an axle extending between said plates;

(e) a strap engaging member extending between said plates at a spaced apart location from said axle;

(f) a lever arm pivotally connected proximate one end thereof to said axle, said lever arm being movable from a first position to a second position;

(g) locking means carried by said lever arm for engagement with said teeth on said plates for permitting movement of said lever arm from said first position to said second position, but preventing movement thereof from said second position to said first position;

(h) an elongated strap having first and second ends said first end of said strap being connected to said lever arm, said strap being disposed intermediate said plates and being entrained around said strap engaging member and under said axle; and (i) second anchor means connected to said second end of said strap for insertion into the aperture provided in the other of said first and second cowling portions, whereby movement of said lever arm toward said second position will urge said first and second portions of said cowling toward said fully closed position.

* * * * *